US011301570B2

(12) United States Patent
Griffin et al.

(10) Patent No.: US 11,301,570 B2
(45) Date of Patent: *Apr. 12, 2022

(54) DIGITAL FORENSICS SYSTEM

(71) Applicant: The Travelers Indemnity Company, Hartford, CT (US)

(72) Inventors: Patrick K. Griffin, East Hampton, CT (US); Leroy D. Emmerthal, Windsor, CT (US); Krystopher Aurigemma, Rocky Hill, CT (US); Eric W. Raabe, East Granby, CT (US); Luis Bedoya, Washington Township, NJ (US); Kurt E. Oestreicher, West Hartford, CT (US); James H. Shanley, Barkhamsted, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,182

(22) Filed: Jan. 20, 2020

(65) Prior Publication Data
US 2020/0167479 A1 May 28, 2020

Related U.S. Application Data

(63) Continuation of application No. 15/619,623, filed on Jun. 12, 2017, now Pat. No. 10,546,133.

(51) Int. Cl.
G06F 21/57 (2013.01)
H04L 29/06 (2006.01)
(Continued)

(52) U.S. Cl.
CPC ............ G06F 21/577 (2013.01); G06F 9/452 (2018.02); G06F 21/50 (2013.01); G06F 21/53 (2013.01);
(Continued)

(58) Field of Classification Search
CPC ......... H04L 63/30; H04L 65/40; H04L 67/34; G06F 21/552; G06F 21/577; G06F 2221/2115
See application file for complete search history.

(56) References Cited

U.S. PATENT DOCUMENTS 5,764,972 A * 6/1998 Crouse .................. G06F 16/113
8,171,108 B2 * 5/2012 Shannon ............... H04L 67/125
709/217

(Continued)

OTHER PUBLICATIONS

EP Application No. 18176941.5 Extended EP Search Report dated Sep. 19, 2018, 8 pages.

Primary Examiner — Lashonda T Jacobs
(74) Attorney, Agent, or Firm — Cantor Colburn LLP

(57) ABSTRACT

A method includes receiving a plurality of sets of extracted data from one or more devices under analysis. An evidence storage server generates a plurality of evidence packages based on a first copy of the plurality of sets of extracted data from the one or more devices under analysis. A virtual desktop server generates one or more virtual desktop sessions that interface with one or more analysis workstations and interface with the evidence storage server to access the first copy of the sets of extracted data in the evidence packages. One or more associated work products are stored in the evidence packages based on a forensic analysis of the first copy of the sets of extracted data in the evidence packages. The one or more associated work products are stored with a second copy of the sets of extracted data to an archive system including a plurality of storage arrays.

20 Claims, 7 Drawing Sheets

(51) Int. Cl.
*G06F 21/56* (2013.01)
*G06F 21/53* (2013.01)
*G06F 21/55* (2013.01)
*G06F 21/50* (2013.01)
*H04L 67/131* (2022.01)
*H04L 67/1095* (2022.01)
*G06F 9/451* (2018.01)
*H04L 65/40* (2022.01)
*H04L 67/00* (2022.01)

(52) U.S. Cl.
CPC .......... *G06F 21/552* (2013.01); *G06F 21/564* (2013.01); *G06F 21/567* (2013.01); *H04L 63/02* (2013.01); *H04L 63/145* (2013.01); *H04L 63/30* (2013.01); *H04L 63/302* (2013.01); *H04L 67/1095* (2013.01); *H04L 67/38* (2013.01); *G06F 2221/2115* (2013.01); *H04L 65/40* (2013.01); *H04L 67/34* (2013.01)

(56) References Cited

U.S. PATENT DOCUMENTS

| | | | |
|---|---|---|---|
| 8,176,557 B2 * | 5/2012 | Adelstein | H04L 63/14 |
| | | | 726/23 |
| 9,037,630 B2 * | 5/2015 | Shannon | G06F 21/552 |
| | | | 709/201 |
| 9,507,936 B2 * | 11/2016 | Hoog | H04L 63/1433 |
| 9,680,844 B2 * | 6/2017 | Thornbury | H04L 63/1408 |
| 9,734,346 B2 * | 8/2017 | Kang | G06F 21/64 |
| 9,979,742 B2 * | 5/2018 | Mumcuoglu | G06F 21/552 |
| 10,078,537 B1 * | 9/2018 | Nanda | H04L 41/0273 |
| 10,079,842 B1 * | 9/2018 | Brandwine | H04L 63/1425 |
| 10,346,497 B1 * | 7/2019 | McIntyre | G06F 16/9554 |
| 10,740,858 B2 * | 8/2020 | McCreight | H04W 4/00 |
| 2004/0260733 A1 * | 12/2004 | Adelstein | H04L 63/14 |
| 2009/0136140 A1 * | 5/2009 | Kim | G06F 21/64 |
| | | | 382/209 |
| 2010/0299740 A1 | 11/2010 | Sheldon et al. | |
| 2011/0153748 A1 * | 6/2011 | Lee | H04L 67/125 |
| | | | 709/205 |
| 2012/0102571 A1 * | 4/2012 | Sheldon | G06F 21/6218 |
| | | | 726/26 |
| 2014/0214885 A1 * | 7/2014 | Park | G06F 16/783 |
| | | | 707/769 |
| 2014/0281320 A1 * | 9/2014 | Sun | G06F 21/53 |
| | | | 711/163 |
| 2016/0247335 A1 | 8/2016 | Daily et al. | |
| 2017/0206102 A1 * | 7/2017 | Lee | G06F 21/88 |
| 2018/0144426 A1 * | 5/2018 | Grbac | G06F 16/48 |
| 2018/0357420 A1 | 12/2018 | Griffin et al. | |

* cited by examiner

DIGITAL FORENSICS SYSTEM

CROSS REFERENCE TO RELATED APPLICATIONS

This application is a continuation of U.S. patent application Ser. No. 15/619,623 filed Jun. 12, 2017 (now U.S. Pat. No. 10,546,133), the entire contents of which are specifically incorporated by reference herein.

BACKGROUND

Digital forensics can be performed to analyze various types of digital media as part of an investigation and analysis process. Digital forensic activities must be performed in a controlled and repeatable manner to ensure that the integrity of the device under analysis is maintained and that malware does not spread from an infected device. If a large variety of devices is to be supported, the number of hardware and software tools needed for analysis and interfacing with devices can become difficult to manage. Further, the ability to use and re-use forensic analysis tools can be constrained by the amount of dedicated processing resources needed to run an analysis session, which can limit the availability of forensic analysis tools and processing resources while a long-running analysis session is active. Digital forensic analysis tools can also be slowed by the need to locally reconfigure a workstation for each analysis session to ensure that the workstation starts from a known good state by removing previously loaded files and reloading the workstation with known good files while isolated from network resources to avoid contamination risks.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

According to an embodiment, a system for digital forensics is provided. The system can balance security, scalability, speed of access, and other factors. The use of virtual desktop sessions rather than dedicated workstations provides flexibility in deployment of processing resources and isolation of threats when analyzing a device infected with malware. High bandwidth access to working data sets and archived datasets can be achieved economically using networked systems in close physical proximity to reduce communication latency. Virtual desktop sessions and servers can be built from a single master image so each new analysis job can start from a known good state. If an analysis desktop session is accidently infected with malware, the infected session can be deleted and rebuilt from the master image. Change control with auditing can be applied to all files and file systems to ensure that analysis support tools and configuration files are not modified without permission and traceability.

A digital forensics system can be implemented in multiple segregated network zones to partition standard analysis tasks from other unsupported or obsolete platforms and/or to study unknown and/or highly contagious/dangerous malware. Physical space segmentation can also be used to separate analysis systems, ingestion systems, and/or archival systems from publicly accessible spaces. Scalability can be provided by configurable support for multiple operating systems, input/output technologies, networked data sources, various file types, and physical media types. Scalability can also be achieved using a modular framework that supports hardware and/or software additions without interrupting work in progress. Scalability and speed can also be improved by using a just-a-bunch-of-disks (JBOD) file system in close physical proximity to manage a portion of archival storage while using a remote (offsite) backup archive for redundancy and geographic diversity. Accordingly, the system may be used for digital forensic analysis in a computer network system that solves multiple network-centric problems that are necessarily rooted in computer technology and specifically arise in the realm of computer networks.

Figure 1:
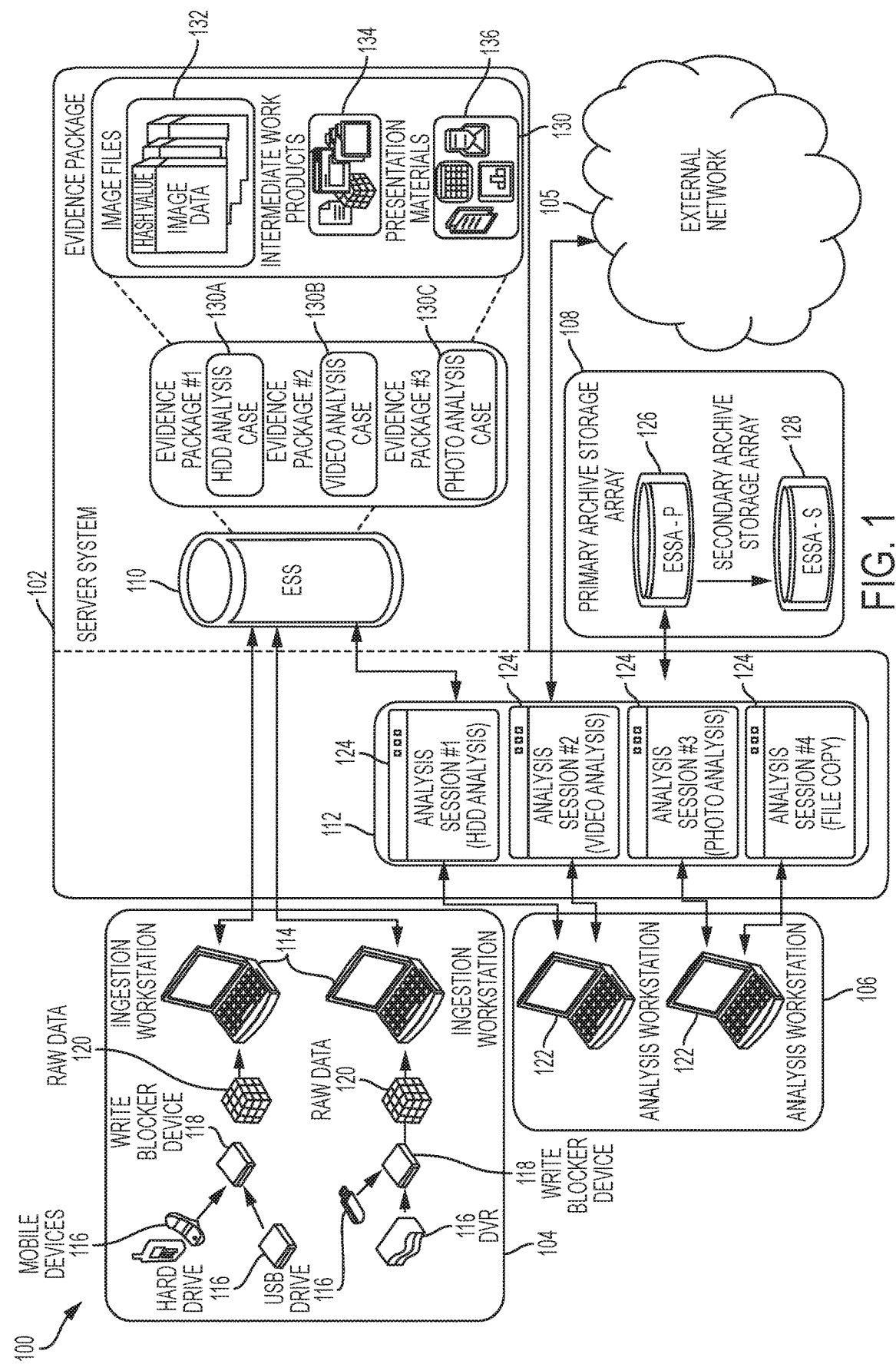
FIG. 1 depicts a block diagram of a digital forensics system according to some embodiments of the present invention.

Turning now to FIG. 1, a digital forensics system 100 is depicted upon which digital forensics may be implemented. The digital forensics system 100 includes a server system 102, an ingestion system 104, an analysis system 106, and an archive system 108. The server system 102 can include an evidence storage server 110 and a virtual desktop server 112. The server system 102 may be an integrated compute/storage/and network appliance (e.g., hyper-converged) to host virtual ingestion and analysis sessions. A hyper-converged system infrastructure can tightly integrate compute, storage, networking and virtualization resources and other technologies in commodity hardware supported by a single vendor, for example. As a hyper-converged system, the server system 102 can be highly scalable to allow changing of storage/processing nodes with auto detection and provisioning while remaining online to increase or decrease available resources. The server system 102 can interface various servers using one or more local or wide area networks and may also interface with one or more external network 105, such as the Internet.

The ingestion system 104 can include one or more ingestion workstations 114 operable to receive a plurality of sets of extracted data from one or more devices under analysis 116. Examples of devices under analysis 116 can include mobile devices, hard disk drives, universal serial bus (USB) drives, digital video recorders, and other types of optical and/or magnetic media compatible with various computer systems known in the art, e.g., laptop computers, desktop computers, tablet computers, and the like. In some embodiments, a write blocking device 118 is coupled between each of the one or more ingestion workstations 114 and the one or more devices under analysis 116. The write blocking device 118 prevents each of the one or more ingestion workstations 114 from writing to the one or more devices under analysis 116 to preserve the integrity of the one or more devices under analysis 116. Each write blocking device 118 can send raw data 120, for instance, in a raw USB-compatible format, to a corresponding one of the one or more ingestion workstations 114.

The analysis system 106 can include one or more analysis workstations 122. The analysis workstations 122 can interface with the one or more virtual desktop sessions 124 generated by processing and memory resources of the virtual desktop server 112. The one or more virtual desktop sessions 124 can be provisioned with a predetermined configuration and toolset operable to perform the forensic analysis based on a data source device type of sets of extracted data (e.g., originating from one or more of the devices under analysis 116). A new instance of the one or more virtual desktop sessions 124 may be provisioned for each new analysis session. The one or more virtual desktop sessions 124 are operable to continue execution as one or more background tasks on the virtual desktop server 112 absent user input on the one or more analysis workstations 122. For example, an analyst can initiate a first virtual desktop session 124 to perform a hard disk drive forensic analysis and then switch to performing a video forensic analysis in a second virtual desktop session 124 from the same analysis workstation 122 without stopping or pausing the hard disk drive forensic analysis. Similarly, an analyst can use a same analysis workstation 122 to perform a photo forensic analysis in one virtual desktop session 124 while a file copy process is active in another virtual desktop session 124 involving different operating systems and tools as virtualized through the same analysis workstation 122.

The archive system 108 can include multiple storage arrays, such as a primary archive storage array 126 and a secondary archive storage array 128. The primary archive storage array 126 and the secondary archive storage array 128 can be at geographically separated locations. The primary archive storage array 126 and the secondary archive storage array 128 are operable to archive data from the evidence storage server 110 for long-term storage. The primary archive storage array 126 and/or the secondary archive storage array 128 can be formed from a JBOD file system scalable to a plurality of petabytes, for example.

The evidence storage server 110 can include a plurality of processing and memory resources operable to generate a plurality of evidence packages 130 based on sets of extracted data from the one or more devices under analysis 116. For example, a first evidence package 130A may be associated with hard disk drive analysis case, a second evidence package 130B can be associated with a video analysis case, and a third evidence package 130C can be associated with a photo analysis case. It will be understood that there can be any number or type of analysis cases captured in each of the evidence packages 130. The evidence packages 130 can include various types of data in different formats packaged together. For instance, one of the evidence packages 130 can include one or more image files 132 (i.e., binary copies of extracted data, not necessarily photo/video files), intermediate work products 134 such as notes and analysis of raw data, and presentation materials 136 such as various reports. In some embodiments, the virtual desktop server 112 is operable to create one or more reports in the one or more virtual desktop sessions 124 based on one or more associated work products and store the reports in the intermediate work products 134 or the presentation materials 136.

In the example of FIG. 1, each of the server system 102, ingestion system 104, analysis system 106, and archive system 108 can include at least one processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the digital forensics system 100 executes computer instructions for implementing the exemplary processes described herein. Instructions that implement various process steps can be executed by different elements of the digital forensics system 100, such as elements of the server system 102, ingestion system 104, analysis system 106, and/or archive system 108.

The ingestion workstations 114 and the analysis workstations 122 may each be implemented using a computer executing one or more computer programs to support carrying out processes described herein. In one embodiment, the ingestion workstations 114 and the analysis workstations 122 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the ingestion workstations 114 and the analysis workstations 122 are operated by users having the role of a forensic analyst or technician.

Each of the server system 102, ingestion system 104, analysis system 106, and archive system 108 can include one or more local data storage devices, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

Communication between the server system 102, ingestion system 104, analysis system 106, and archive system 108 can be established using any type of computer communication technology within the digital forensics system 100 and can extend beyond the digital forensics system 100 as depicted. Examples include a wide area network (WAN), a local area network (LAN), a global network (e.g., Internet), a virtual private network (VPN), and an intranet. Communication within the digital forensics system 100 may be implemented using a wired network, an optical network, a wireless network and/or any kind of physical network implementation known in the art that meets the desired level of security.

Figure 2A:
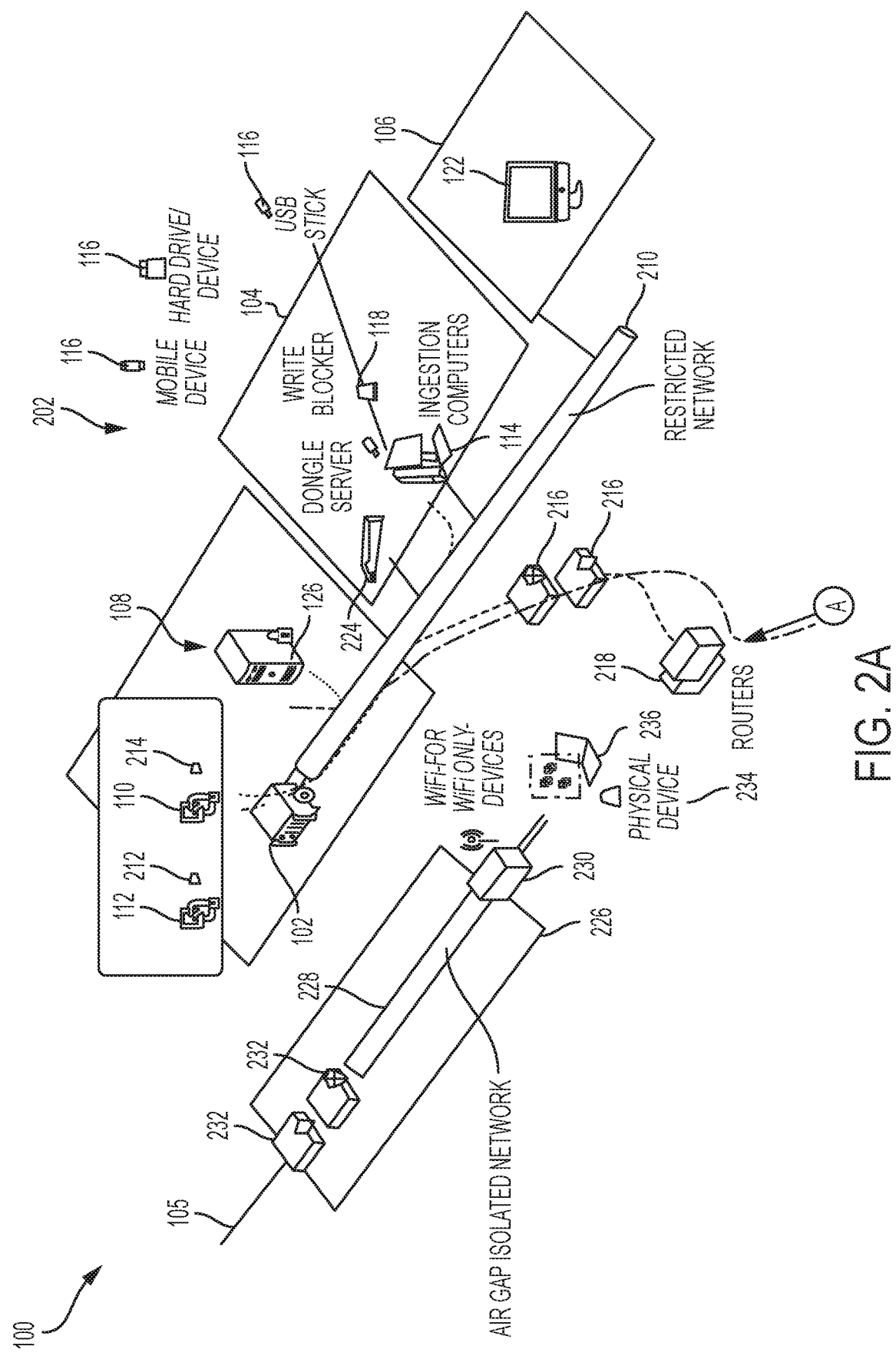
FIGS. 2A and 2B depict a physical architecture of a digital forensics system according to some embodiments of the present invention.
Figure 2B:
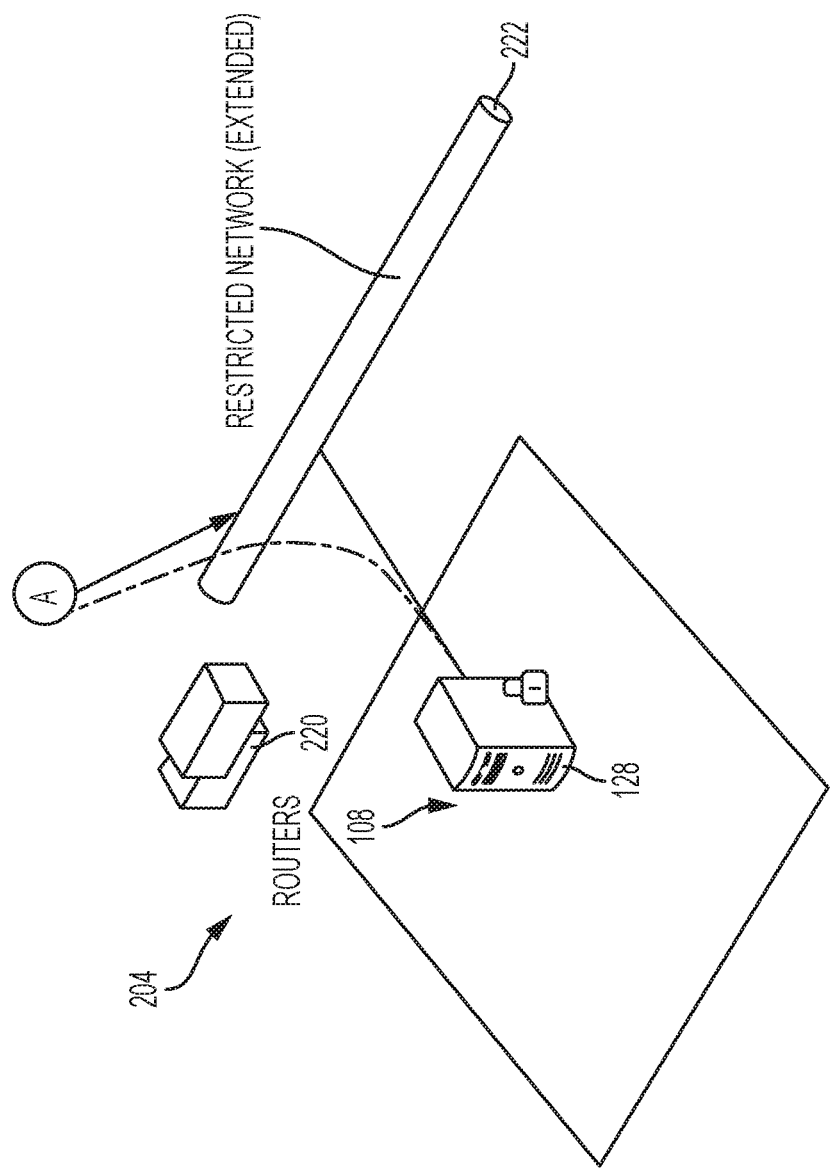

FIGS. 2A and 2B depict an example of a physical architecture of the digital forensics system 100 of FIG. 1 according to an embodiment. The server system 102, ingestion system 104, analysis system 106, and a portion of the archive system 108 can be at a first geographic location 202 that is separate from another portion of the archive system 108 at a second geographic location 204. In the example of FIGS. 2A and 2B, the archive system 108 manages the primary archive storage array 126 at the first geographic location 202 and manages the secondary archive storage array 128 at the second geographic location 204. A restricted access network 210 can support data exchange between the server system 102, ingestion system 104, analysis system 106, and archive system 108, for instance, using a metro area network class line. The restricted access network 210 can limit the transfer of data files, such as working files 212 on the virtual desktop server 112 or finalized files 214 on the evidence storage server 110 to/from the primary archive storage array 126 and the secondary archive storage array 128. Redundant switches 216 and routers 218 can provide firewalls and intrusion prevention and detection with respect to the restricted access network 210, and routers 220 can control access on an extended restricted access network 222 when accessing the secondary archive storage array 128.

In some embodiments, the digital forensics system 100 can also include a dongle server 224 operable to communicate with the virtual desktop server 112 and limit access to one or more licenses associated with one or more applications of a toolset accessible through the ingestion workstations 114 and/or the analysis workstations 122. For example, plugging a USB drive containing licenses into the dongle server 224 can enable access to a pool of licenses for ingestion tools and/or forensic analysis tools. This maximizes license availability rather than limiting tool access to users who are permanently assigned licenses or must otherwise individually possess a license dongle (e.g., a USB drive holding one or more licenses).

At the first geographic location 202 or elsewhere, the digital forensics system 100 can also include a malware analysis system 226 that is physically separated from the ingestion system 104, the analysis system 106, the archive system 108, and the server system 102 by an air gap network 228. The air gap network 228 can include any type of wireless communication protocol support between a wireless router 230 and external network switches 232 operable to access the external network 105. Various physical devices 234, hypervisor devices 236, and other device types, such as displays (not depicted) can interface with the malware analysis system 226. The malware analysis system 226 can be a limited access network interface operable to selectively allow and block one or more attempted Internet access requests to the external network 105. The limited access network interface formed between the wireless router 230 and external network switches 232 is operable to track one or more attempted interactions with one or more remote systems across the Internet. Some interactions may be observed to assist in determining an external entity that is attempting to communicate with a malware infected device, including a physical device 234 or a simulated device through the hypervisor devices 236 using virtual machine resources. Analysis actions performed at the malware analysis system 226 can include interactions with otherwise unsupported software to limit possible contamination of other systems. Case data collected at the malware analysis system 226 can be archived on a USB drive and brought to the ingestion system 104 as a device under analysis 116, for instance. Resulting files and transfers to and from the malware analysis system 226 can be encrypted. Other connections to the external network 105 may also be supported by various elements of the forensics analysis system 100.

Figure 3:
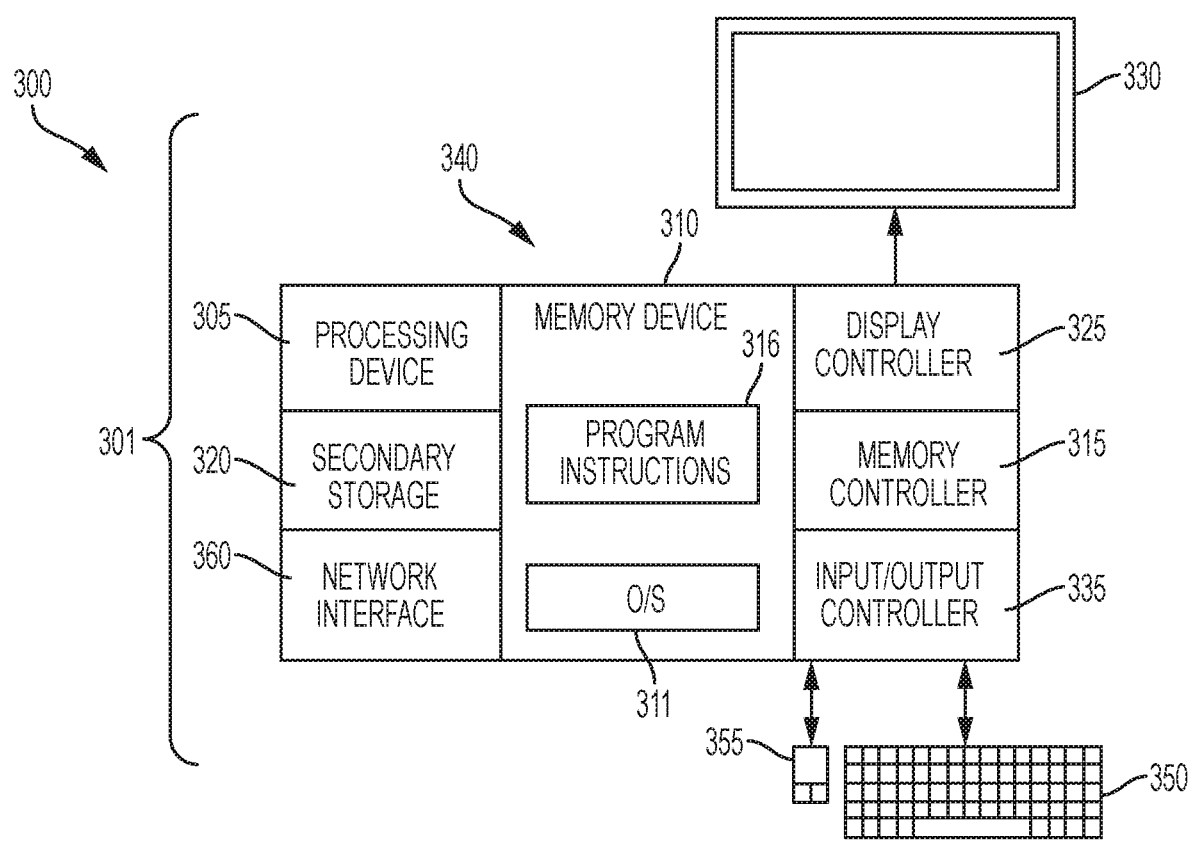
FIG. 3 depicts a computer system according to some embodiments of the present invention.

FIG. 3 depicts a block diagram of a system 300 according to an embodiment. The system 300 is depicted embodied in a computer 301 in FIG. 3. The system 300 is an example of one or a portion of the server system 102, ingestion system 104, analysis system 106, or archive system 108 of FIG. 1.

In an exemplary embodiment, in terms of hardware architecture, as shown in FIG. 3, the computer 301 includes a processing device 305 and a memory device 310 coupled to a memory controller 315 and an input/output controller 335. The input/output controller 335 may comprise, for example, one or more buses or other wired or wireless connections, as is known in the art. The input/output controller 335 may have additional elements, which are omitted for simplicity, such as controllers, buffers (caches), drivers, repeaters, and receivers, to enable communications. Further, the computer 301 may include address, control, and/or data connections to enable appropriate communications among the aforementioned components.

In an exemplary embodiment, a keyboard 350 and mouse 355 or similar devices can be coupled to the input/output controller 335. Alternatively, input may be received via a touch-sensitive or motion sensitive interface (not depicted). The computer 301 can further include a display controller 325 coupled to a display 330.

The processing device 305 comprises a hardware device for executing software, particularly software stored in secondary storage 320 or memory device 310. The processing device 305 may comprise any custom made or commercially available computer processor, a central processing unit (CPU), an auxiliary processor among several processors associated with the computer 301, a semiconductor-based microprocessor (in the form of a microchip or chip set), a macro-processor, or generally any device for executing instructions.

The memory device 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 310 may incorporate electronic, magnetic, optical, and/or other types of storage media. Accordingly, the memory device 310 is an example of a tangible computer readable storage medium 340 upon which instructions executable by the processing device 305 may be embodied as a computer program product. The memory device 310 can have a distributed architecture, where various components are situated remote from one another, but can be accessed by one or more instances of the processing device 305.

The instructions in memory device 310 may include one or more separate programs, each of which comprises an ordered listing of executable instructions for implementing logical functions. In the example of FIG. 3, the instructions in the memory device 310 include a suitable operating system (OS) 311 and program instructions 316. The operating system 311 essentially controls the execution of other computer programs and provides scheduling, input-output control, file and data management, memory management, and communication control and related services. When the computer 301 is in operation, the processing device 305 is configured to execute instructions stored within the memory device 310, to communicate data to and from the memory device 310, and to generally control operations of the computer 301 pursuant to the instructions. Examples of program instructions 316 can include instructions to implement the server system 102, ingestion system 104, analysis system 106, and/or archive system 108 of FIG. 1.

The computer 301 of FIG. 3 also includes a network interface 360 that can establish communication channels with one or more other computer systems via one or more network links. The network interface 360 can support wired and/or wireless communication protocols known in the art. For example, when embodied in the server system 102, the network interface 360 can establish communication channels with at least one of ingestion system 104, analysis system 106, or archive system 108 via the restricted access network 210 or the extended restricted access network 222 of FIGS. 2A and 2B.

Figure 4A:
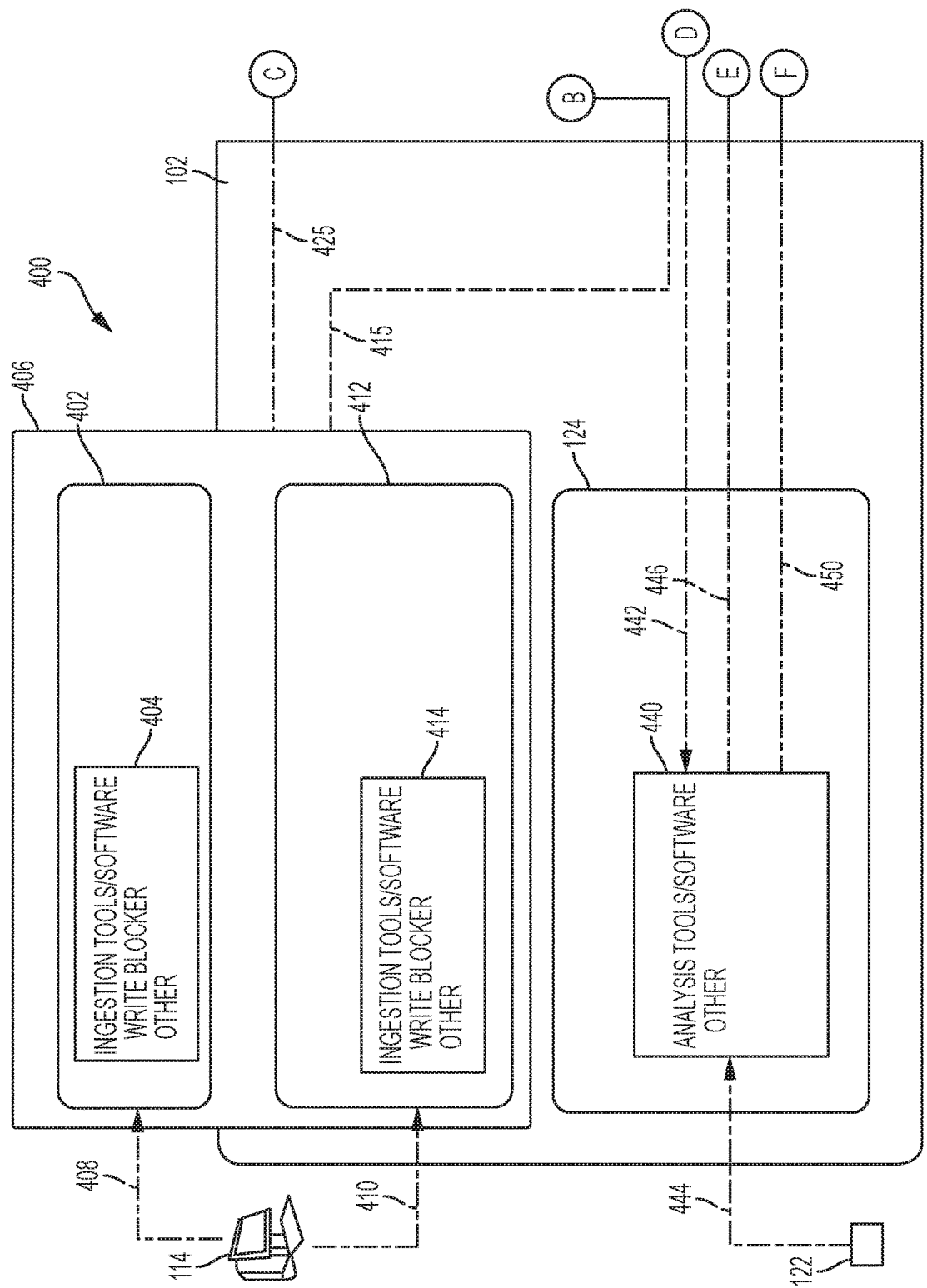
FIGS. 4A and 4B depict a data flow diagram according to some embodiments of the present invention.
Figure 4B:
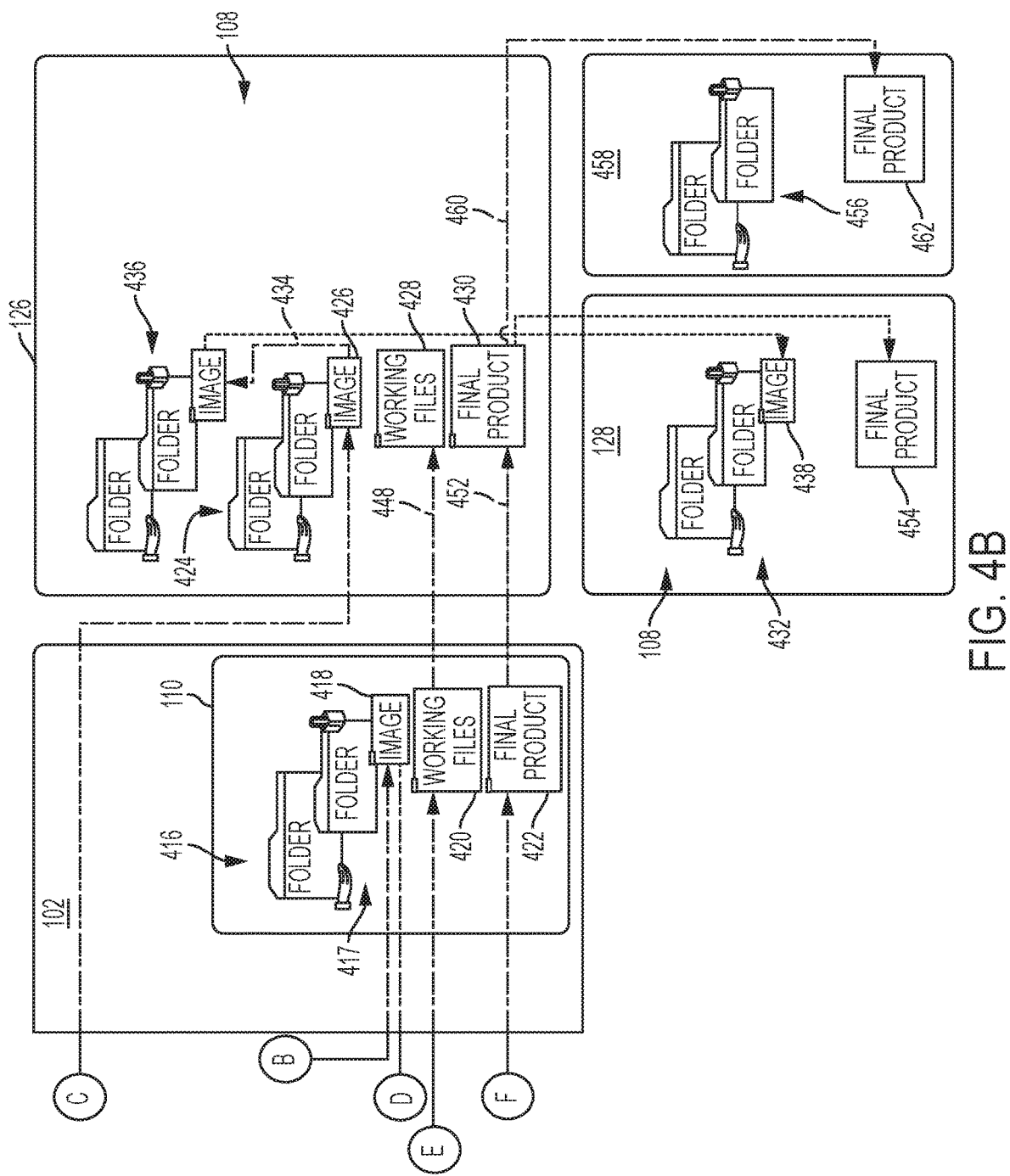

FIGS. 4A and 4B depict an example of a data flow 400 according to an embodiment and is described in reference to FIGS. 1-3. Digital forensics analysis can begin with ingestion of data from a device under analysis 116, Internet social media or a video site, for example, as may be accessed over an external network 105. A device under analysis 116 can be connected to an ingestion workstation 114 using an appropriate cable for an input/output interface of the device under analysis 116 and may pass through a write blocker 118.

Prior to starting ingestion of data, a physical ingestion computer 402 can be prepared including ingestion tools 404 as part of ingestion processing 406 in a physical computer ingestion process 408. Alternatively, an ingestion virtual desktop session 412 can be provisioned including ingestion tools 414 as part of ingestion processing 406 in a virtual computer ingestion process 410 with a physical ingestion port of the ingestion workstation 114 used to connect with the device under analysis 116.

A new ingestion virtual desktop session 412 can be provisioned each time that a new device under analysis 116 is connected to eliminate the possibility of contamination. The ingestion virtual desktop session 412 can be hosted off the server system 102 to provide high levels of performance and concurrency. The server system 102 can also serve up a separate file system used to store a separate safety copy of the ingested data, for instance, in file system 416 in the evidence storage server 110. A file share can be mapped from the file system 416 to the physical ingestion computer 402 and/or the ingestion virtual desktop session 412 to store 415 ingested data and associated files as a first copy 417 of the sets of extracted data from one or more devices under analysis 116, which can include image data 418, working files 420, and final products 422 to group as an evidence package 130. After ingesting the data, another local working copy of ingested data and associated files can be stored 425 to the primary archive storage array 126 of the archive system 108 as a second copy 424 of the sets of extracted data, which can include image data 426, working files 428, and final products 430.

The archive system 108 can use replication to create a third copy 432 of the sets of extracted data from the primary archive storage array 126 to the secondary archive storage array 128, which may be performed by replication 434 through a staging area 436 of the primary archive storage array 126 based on the second copy 424 of the sets of extracted data. The archive system 108 can write the third copy 432 of the sets of extracted data to the secondary archive storage array 128. The copies 417, 424, 432 of data can be partitioned and grouped such that image data 418 in the first copy 417, image data 426 in the second copy 424, and image data 438 in the third copy 432 can be updated at different times relative to other portions of each evidence package 130. Each copy 417, 424, 432 of data can be cryptographically hashed to establish that each is an original/authentic copy. Cryptographic hashing may be applied to the image data 418, 426, 438 such that each image file 132 includes a respective copy of the image data 418, 426, 438 with a corresponding hash value.

In embodiments, after creating the second copy 424 of image data 426 and the third copy 432 of the image data 438 from ingested data, a new virtual desktop session 124 can be provisioned with a wide range of analysis tools 440 to examine 442 the ingested data captured in the image data 418 of the first copy 417 in an analysis process 444 accessible through an analysis workstation 122. A new virtual desktop session 124 can be provisioned each time that an analyst starts working with a new instance of image data 418 to eliminate the possibility of contamination. The tools 440 run in the virtual desktop session 124 and can be accessed from multiple analysis workstations 122 and/or other devices (not depicted) operable to communicate on the restricted access network 210. The tools 440 can run for a number of hours, for example, and multiple instances of the tools 440 can be run in the same virtual desktop session 124 or across multiple virtual desktop sessions 124 simultaneously.

Once the analysis is complete and the activity is closed, all activity-related files can be compiled, including working files and/or final products such as analysis output, presentations, documents, reports, and the like. The working files 420 can be updated 446 by the tools 440 and copied 448 to working files 428. The working files 428 can be archived in the primary archive storage array 126 but need not be copied to the secondary archive storage array 128. The virtual desktop server 112 is operable to create one or more reports in the virtual desktop session 124 based on one or more associated work products, for instance, final products 422 generated by tools 440 based on work files 420. The final products 422 can be copied 452 to final products 430. The archive system 108 can replicate one or more reports, such as final products 430, based on the one or more associated work products from the primary archive storage array 126 to the secondary archive storage array 128 as final products 454. Other file systems 456 on one or more other servers 458 may also be sent 460 a replication of the one or more reports as final products 462.

Archived files in the archive system 108 can be organized and partitioned in various folders and subfolders. For example, folder names can be created that contain a combination of a case file identifier, a case file date, and/or other identifying information. Data can be located based on a case file identifier or other identifier to locate targeted archived data, for example. Indexing and keyword searches can be supported in the archive system 108 to increase data location and retrieval speeds. Access logs, modification logs, and/or other controls can be applied to the archive system 108 to limit access and provide traceability for actions taken.

Figure 5:
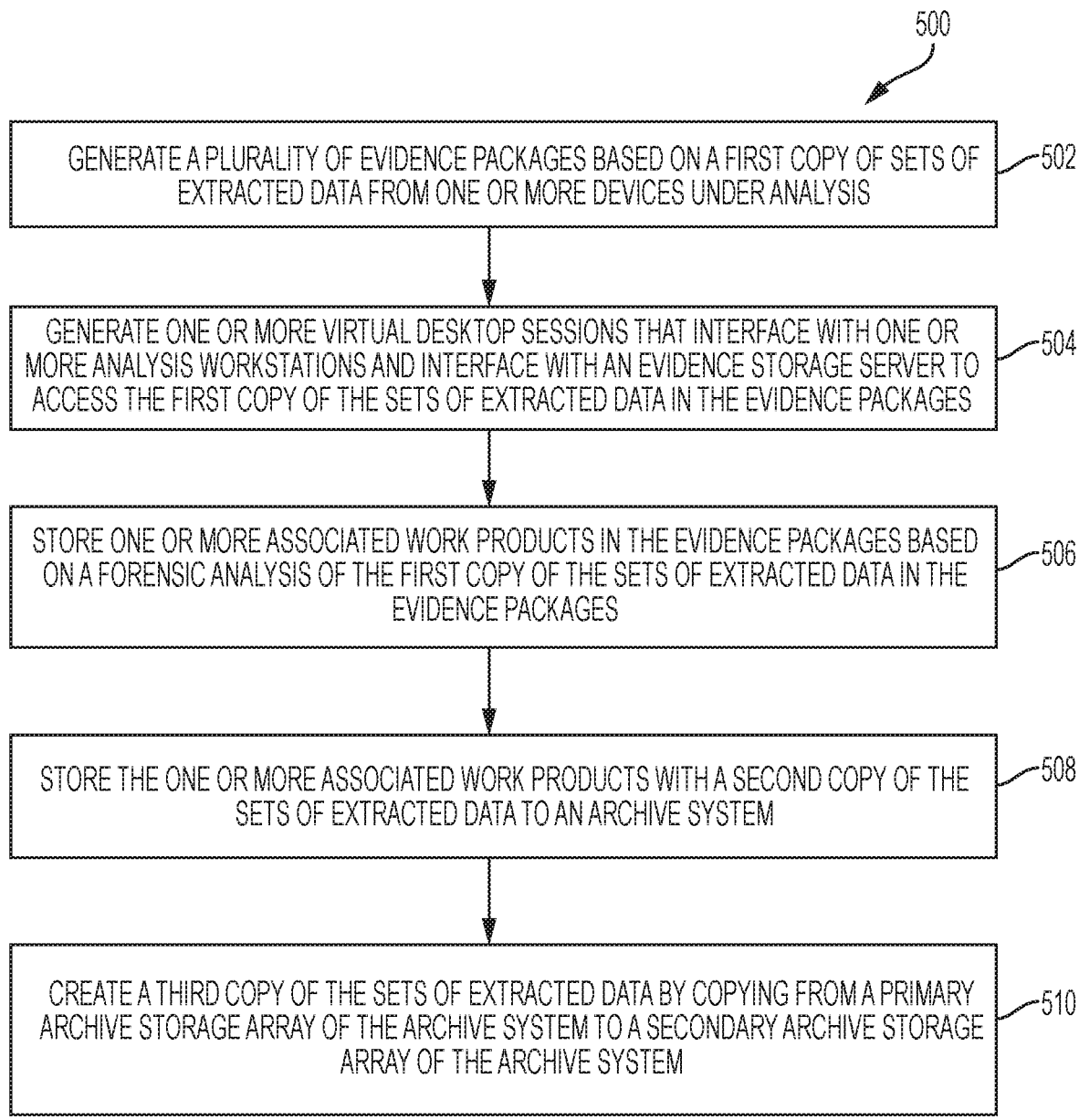
FIG. 5 depicts a process flow according to some embodiments of the present invention.

Turning now to FIG. 5, a process flow 500 is depicted according to an embodiment. The process flow 500 includes a number of steps that may be performed in the depicted sequence or in an alternate sequence. The process flow 500 may be performed by the digital forensics system 100 of FIG. 1. In one embodiment, the process flow 500 is performed by the server system 102 of FIG. 1 in combination with the ingestion system 104, analysis system 106, and archive system 108. Although the example of process flow 500 is described in reference to the evidence storage server 110 and the virtual desktop server 112 of the server system 102, the process flow 500 can be distributed over one or more other servers (not depicted). The process flow 500 is described in reference to FIGS. 1-5.

At step 502, a plurality of evidence packages 130 can be generated based on a first copy 417 of sets of extracted data from one or more devices under analysis 116 by a first plurality of processing and memory resources of the evidence storage server 110.

At step 504, one or more virtual desktop sessions 124 that interface with one or more analysis workstations 122 of the analysis system 106 and interface with the evidence storage server 110 to access the first copy 417 of the sets of extracted data in the evidence packages 130 can be generated by a second plurality of processing and memory resources of the virtual desktop server 112. The virtual desktop server 112 is operable to create one or more reports, such as final products 422, in the one or more virtual desktop sessions 124 based on the one or more associated work products.

At step 506, one or more associated work products, such as working files 420 of intermediate work products 134 can be stored in the evidence packages 130 based on a forensic analysis of the first copy 417 of the sets of extracted data in the evidence packages 130. At step 508, one or more associated work products can be stored with a second copy 424 of the sets of extracted data to the archive system 108, for example, as working files 428.

At step 510, a third copy 432 of the sets of extracted data can be created by copying the second copy 424 of the sets of extracted data from the primary archive storage array 126 to the secondary archive storage array 128. The second copy 424 of the sets of extracted data can be copied through a staging area 436 of the primary archive storage array 126 and provided to the secondary archive storage array 128 to create the third copy 432.

In embodiments, the archive system 108 can replicate one or more reports (e.g., final products 420) based on the one or more associated work products from the primary archive storage array 126 to the secondary archive storage array 128, for instance, as final products 454. Each of the first copy 417 of the sets of extracted data, the second copy 424 of the sets of extracted data, and the third copy 432 of the sets of extracted data can be cryptographically hashed to verify authenticity and an absence of modification. The archive system 108 can manage data on the primary archive storage array 126 and the secondary archive storage array 128 using a JBOD file system scalable to a plurality of petabytes, for example.

In embodiments, the one or more virtual desktop sessions 124 can be provisioned with a predetermined configuration and toolset (e.g., tools 440) operable to perform the forensic analysis based on a data source device type of the sets of extracted data. The data source device type can be one or more of: a hard disk drive, a digital video recorder, a mobile device, a USB drive, an optical medium, and a magnetic medium. A new instance of the one or more virtual desktop sessions 124 can be provisioned for each new analysis session. The one or more virtual desktop sessions 124 can continue execution as one or more background tasks on the virtual desktop server 112 absent user input on the one or more analysis workstations 122.

Technical effects include rapid data storage intake, secure data duplication with large-scale data archiving, and providing a controlled access environment for malware analysis.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseb and or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A method, comprising:
   receiving a plurality of sets of extracted data from one or more devices under analysis;
   generating, by an evidence storage server, a plurality of evidence packages based on a first copy of the plurality of sets of extracted data from the one or more devices under analysis;
   generating, by a virtual desktop server, one or more virtual desktop sessions that interface with one or more analysis workstations and interface with the evidence storage server to access the first copy of the sets of extracted data in the evidence packages;
   storing one or more associated work products in the evidence packages based on a forensic analysis of the first copy of the sets of extracted data in the evidence packages; and
   storing the one or more associated work products with a second copy of the sets of extracted data to an archive system comprising a plurality of storage arrays.

2. The method of claim 1, further comprising:
   creating one or more reports in the one or more virtual desktop sessions based on the one or more associated work products.

3. The method of claim 1, wherein the sets of extracted data from the one or more devices under analysis are received at an ingestion system comprising one or more ingestion workstations, and the method further comprises:
   preventing, by a write blocking device, each of the one or more ingestion workstations from writing to the one or more devices under analysis.

4. The method of claim 1, wherein the plurality of storage arrays of the archive system is partitioned into a primary archive storage array and a secondary archive storage array at geographically separated locations.

5. The method of claim 4, further comprising:
   creating a third copy of the sets of extracted data by copying from the primary archive storage array to the secondary archive storage array.

6. The method of claim 5, further comprising:
   copying the second copy of the sets of extracted data through a staging area of the primary archive storage array; and
   providing the second copy of the sets of extracted data to the secondary archive storage array to create the third copy.

7. The method of claim 5, further comprising:
   replicating one or more reports based on the one or more associated work products from the primary archive storage array to the secondary archive storage array.

8. The method of claim 5, wherein each of the first copy of the sets of extracted data, the second copy of the sets of extracted data, and the third copy of the sets of extracted data is cryptographically hashed to verify authenticity and an absence of modification.

9. The method of claim 8, wherein each of the first copy of the sets of extracted data, the second copy of the sets of extracted data, and the third copy of the sets of extracted data comprise image data stored with a hash value in one or more image files.

10. The method of claim 5, wherein the archive system manages data on the primary archive storage array and the secondary archive storage array using a just-a-bunch-of-disks (JBOD) file system scalable to a plurality of petabytes.

11. The method of claim 1, further comprising:
    provisioning the one or more virtual desktop sessions with a predetermined configuration and toolset operable to perform the forensic analysis based on a data source device type of the sets of extracted data.

12. The method of claim 11, wherein the data source device type comprises one or more of: a hard disk drive, a digital video recorder, a mobile device, a universal serial bus drive, an optical medium, and a magnetic medium.

13. The method of claim 11, wherein a new instance of the one or more virtual desktop sessions is provisioned for each new analysis session.

14. The method of claim 13, further comprising:
    continuing execution, by the one or more virtual desktop sessions, as one or more background tasks on the virtual desktop server absent user input on the one or more analysis workstations.

15. The method of claim 11, further comprising:
    using a dongle server to communicate with the virtual desktop server and limit access to one or more licenses associated with one or more applications of the toolset, wherein the dongle server comprises a universal serial bus drive interface.

16. The method of claim 1, further comprising:
    performing malware analysis using a malware analysis system that is physically separated from the evidence storage server, the virtual desktop server, the archive system by an air gap network.

17. The method of claim 16, further comprising:
selectively allowing and blocking one or more attempted access requests, by a limited access network interface of the malware analysis system, with respect to an external network.

18. The method of claim 17, further comprising:
tracking, by the limited access network interface, one or more attempted interactions with one or more remote systems across the external network.

19. The method of claim 1, wherein the plurality of sets of extracted data from one or more devices under analysis are received by an ingestion system comprising one or more ingestion workstations, and wherein the one or more ingestion workstations comprise one or more computers comprising a processing device, a memory device, and an input/output controller.

20. The method of claim 19, wherein a server system comprises the evidence storage server comprising a first plurality of processing and memory resources, and the virtual desktop server comprises a second plurality of processing and memory resources.

\* \* \* \* \*